United States Patent [19]
Andrews

[11] Patent Number: 6,132,483
[45] Date of Patent: Oct. 17, 2000

[54] FILTER FOR RAILROAD CAR CONTROL VALVE PIPE BRACKET AND ACCESS PLATE

[75] Inventor: Lawrence J. Andrews, Cheswick, Pa.

[73] Assignee: Westinghouse Air Brake Company, Wilmerding, Pa.

[21] Appl. No.: 09/069,373

[22] Filed: Apr. 29, 1998

[51] Int. Cl.[7] ................................................ B01D 46/10
[52] U.S. Cl. ..................... 55/385.1; 55/463; 55/506; 55/521; 55/529; 210/445; 210/446
[58] Field of Search .................................. 55/385.1, 501, 55/506, 463, 521, 529, DIG. 20; 210/445, 446, 448, 452, 463

[56] References Cited

U.S. PATENT DOCUMENTS

| | | | |
|---|---|---|---|
| 1,022,277 | 4/1912 | Taack | 55/DIG. 20 |
| 1,158,989 | 11/1915 | Berry et al. | 55/DIG. 20 |
| 2,019,094 | 10/1935 | Rice et al. | 210/445 |
| 2,068,837 | 1/1937 | Aronson | 210/445 |
| 2,068,858 | 1/1937 | Jones | 210/445 |
| 3,592,768 | 7/1971 | Parker | 210/445 |
| 3,762,564 | 10/1973 | Weedon et al. | 210/446 |
| 3,794,180 | 2/1974 | Blocker | 210/445 |
| 4,702,754 | 10/1987 | Blocker | 55/529 |
| 5,269,824 | 12/1993 | Takita | 55/385.1 |
| 5,807,415 | 9/1998 | Leo | 55/529 |

Primary Examiner—David A. Simmons
Assistant Examiner—Minh-Chau T. Pham
Attorney, Agent, or Firm—James Ray & Asociates

[57] ABSTRACT

An insert filter designed for press-fitting into airway port of hardware apparatus of a railway air brake system whereby the airway ports have at least two different diameters, the insert filter having a ring member defining an opening, a plurality of spaced support ribs extending from a first side of the ring member and intersecting at a location spaced from that first side of the ring member, and a screen mesh supported by the plurality of spaced rib supports defining a volume adjacent to the opening through the ring member. Each of said support ribs having a primary interface rib surface adjacent to an outer edge surface of the ring member adapted to engage inner edge surfaces of a larger, first airway port, and a secondary interface rib surface adjacent to the primary interface rib surface adapted to engage inner edge surfaces of a smaller second airway port.

20 Claims, 4 Drawing Sheets

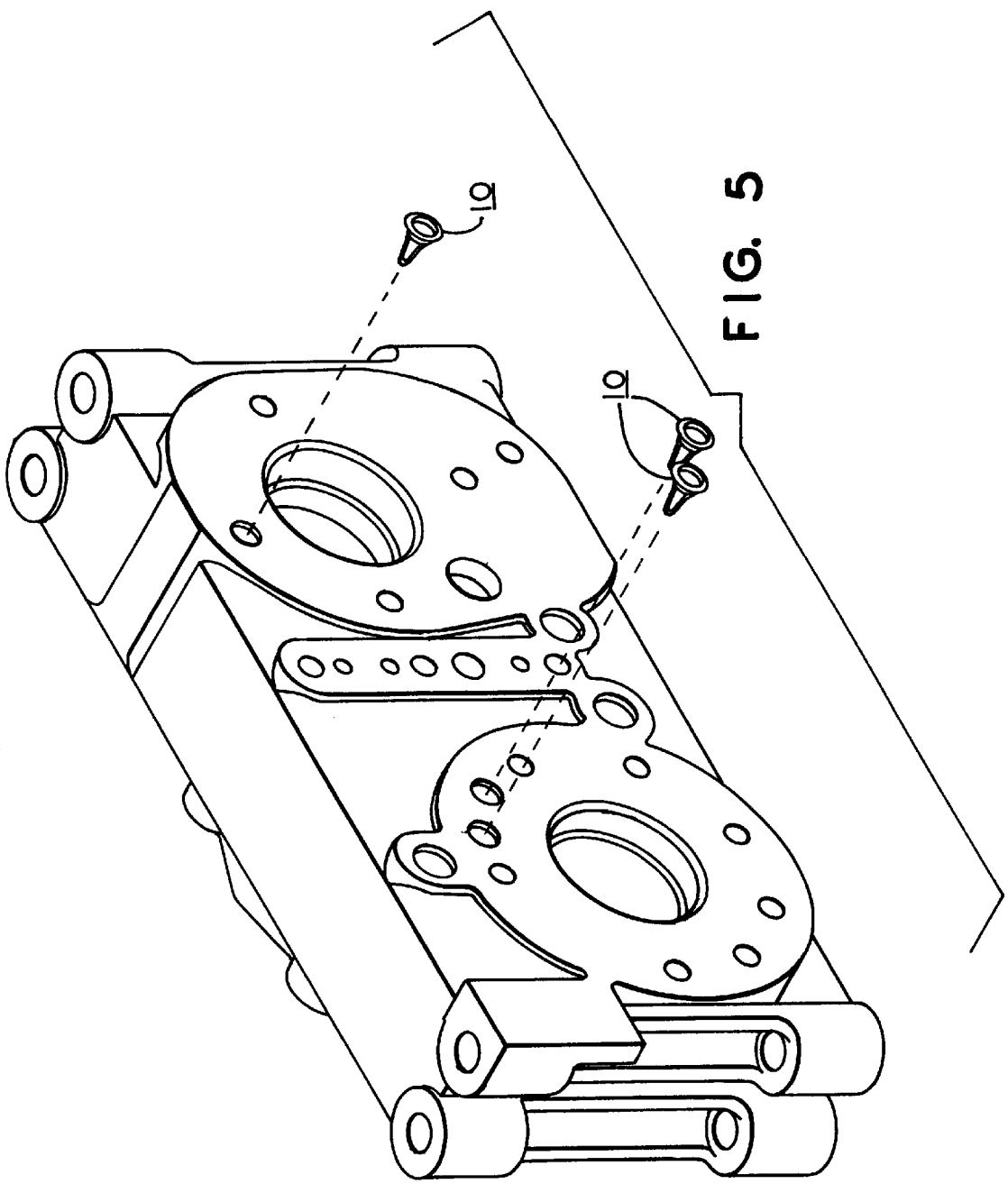

FILTER FOR RAILROAD CAR CONTROL VALVE PIPE BRACKET AND ACCESS PLATE

FIELD OF THE INVENTION

The present invention relates generally to filters as are used in various components of hardware of railway air brake systems and, more particularly, this invention relates to a unique and improved filter insert as can be interchangeably used with certain railway car control valve pipe brackets on one hand, and access plates on the other, thereby eliminating the possibility of mis-application, as well as eliminating the need to manufacture and stock two different filter inserts, one designed for use with the control valve pipe brackets and the other designed for use with access plates. Accordingly, the invention is further addressed to an insert filter which can be press-fitted into airway ports of two or more different sizes within such components.

BACKGROUND OF THE INVENTION

As is generally well known to persons familiar with the art, the air brake systems in railway cars include a large number of component parts for applying either service brake pressure or emergency brake pressure to the car's brake pipe. Two of such common components are a railway car control valve pipe bracket and an access plate. Each of these two component parts are provided with a plurality of small airway ports through which a portion of the compressed air of the air brake system must pass, and such air way ports are normally provided with a press-fitted filter insert for filtering-out any particulate matter entrapped within the air passing therethrough. The press-fitted filter inserts are provided with a circumferential wall portion sized to engage a circumferential wall portion of the airway ports so as to be tightly maintained within the port not permitting any air leaks therearound. While the airway ports in such control valve pipe brackets and such access plates are very nearly the same size, they are not in fact quite the same, and hence the filter inserts as are to be fitted within the airway ports of the two components are not identical and hence not interchangeable. Specifically, the diameters of the airway ports into the DPX Pipe Brackets are approximately 10% smaller than those of the SCTD Access Plates. However, because of their similarity in size and appearance, it would not be unexpected for service personnel to mistakenly insert the wrong filter insert into either a control valve pipe bracket or an access plate with the result that the hardware will not function properly.

Besides the above operational problems that can result, the need to manufacture, maintain, stock, catalog, ship, etc. two different filter insert types adds considerably to the costs of manufacturers, suppliers and service facilities.

SUMMARY OF THE INVENTION

This invention is predicated on the design and development of a single filter insert design that can interchangeably be used in either SCTD Access Plate, or DPX Pipe Bracket. Specifically, the designs of the prior art insert filters for the SCTD Access Plate and the DPX Pipe Brackets have been consolidated and modified to provide a new and improved insert filter design which can readily be press fitted into airway ports of either an SCTD Access Plate, or a DPX Pipe Bracket.

In a significantly broader sense, this invention is predicated upon a unique design for an insert filter for use within hardware apparatus of a railway air brake system on a railway car which can suitable be press-fitted within airway ports of two or possibly more different sizes; i.e., diameters, to thereby eliminate the need to manufacture and stock insert filters in multiple sizes.

In essence, the inventive insert filter includes a ring member defining an opening and a plurality of spaced support ribs extending from one side of the ring member and intersecting at a location spaced from ring member opening to defining a volume adjacent to the opening. The support ribs in combination support an air filtering screen mesh which further defines the volume adjacent to the opening. Each of the support ribs is provided with a primary interface rib surface or flange adjacent to an outer edge surface of the ring member which are adapted to engage inner edge surfaces of a first airway port having a first diameter. A secondary interface rib surface is also provided adjacent to each primary interface rib surface adapted to engage inner edge surfaces of a second airway port having a diameter smaller than that of the first airway port. Accordingly, when the insert filter is press-fitted into an airway port having the larger diameter, the primary interface rib surfaces will engage the cylindrical side walls thereof. When the same insert filter is press-fitted into an airway port having the smaller diameter, the secondary interface rib surfaces will engage the cylindrical side walls thereof. Obviously, the airway port having the smaller diameter will have to be counterbored to the extent necessary to receive the primary interface ribs.

OBJECTS OF THE INVENTION

Accordingly, it is one of the primary objects of the present invention to consolidate the designs of similar insert filters into a design that can be used in multiple applications.

Another object of this invention is to provide a new and improved interchangeable filter insert for use with either an SCTD Access Plate, and a DPX Pipe Bracket.

A further object of this invention is to provide a new and improved interchangeable filter insert for use with either an SCTD Access Plate, and a DPX Pipe Bracket to eliminate the need to manufacture and stock separate filter inserts for each of these components.

Still another object of this invention is to provide a new and improved interchangeable filter insert for use with either an SCTD Access Plate, and a DPX Pipe Bracket to eliminate the possibility of a mis-application of inserting a wrong filter insert into any of these components.

An even further object of this invention is to provide a new and improved filter insert which can be press-fitted into airway ports of at least two different diameters.

A still further object of this invention is to reduce the cost of manufacturing, stocking, shipping of multiple sized filter inserts as will naturally result from standardization of such multiple sized filter inserts.

In addition to the several objects and advantages of the present invention which have been described in detail above, various other objects and advantages of the instant invention will become more readily apparent to those persons who are skilled in the railway air brake art from the following more detailed description of the invention, particularly, when such description is taken in conjunction with the attached drawing figures as described below and with the appended claims.

BRIEF DESCRIPTION OF THE DRAWINGS

FIG. 5 is an isometric view of a pipe bracket showing where the insert filters of FIG. 1 are insertable.

DESCRIPTION OF A PREFERRED EMBODIMENT OF THE INVENTION

Figure 1:
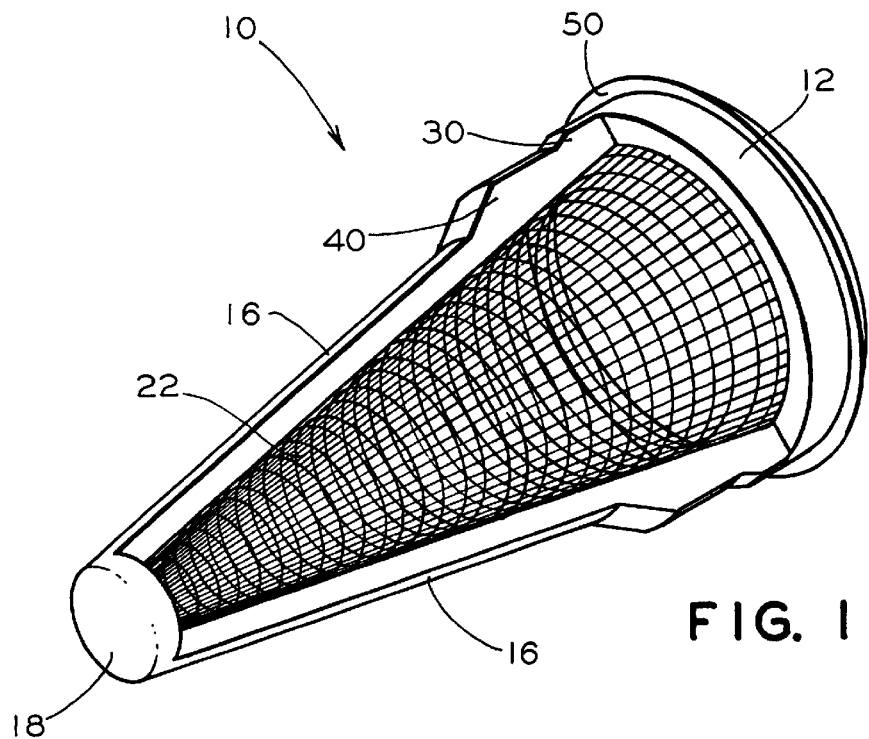
FIG. 1 is an isometric view of an insert filter in accordance with a currently preferred embodiment of this invention as designed to be press-fitted within either an SCTD Access Plate, or a DPX Pipe Bracket.
Figure 6:
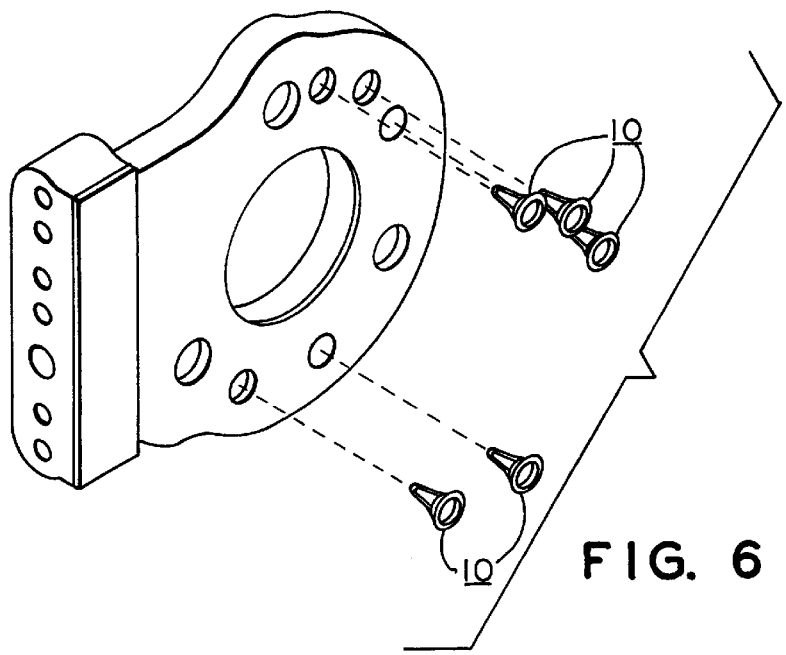
FIG. 6 is an isometric view of an access plate showing where the insert filters of FIG. 1 are insertable.

Prior to proceeding with a more detailed description of the subject invention, it should be noted that for the sake of clarity and understanding of the invention, identical components which have identical functions have been identified with identical reference numerals throughout the several views illustrated in the attached drawings.

Figure 2:
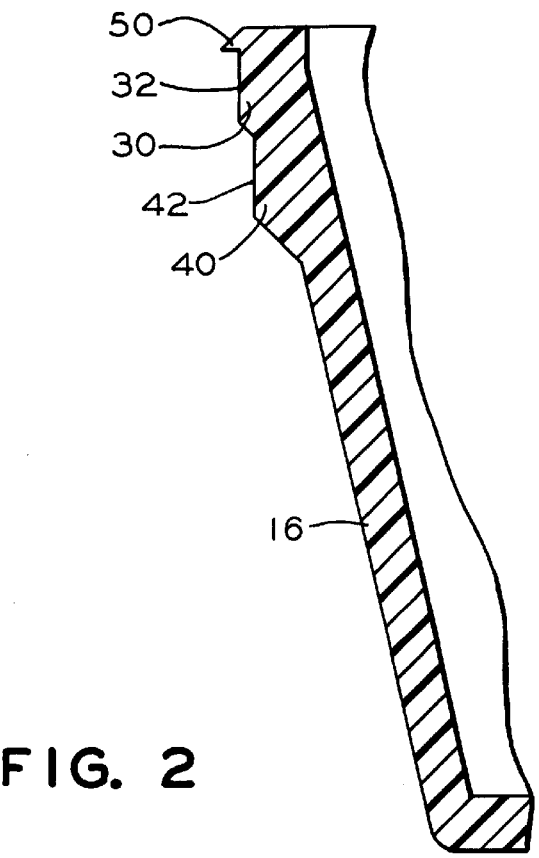
FIG. 2 is an enlarged side view of an upper portion of a support rib on the insert filter of FIG. 1 illustrating the primary and secondary flanges and the primary and secondary interface rib surfaces in detailed section.

Reference to FIGS. 1 and 2 will illustrate a presently preferred embodiment of this invention, namely, a conically-shaped filter insert, generally designated 10, which can interchangeably be press-fitted into either an SCTD Access Plate, or a DPX Pipe Bracket. In essence, the filter insert 10 comprises a ring member 12 defining a closed, circular opening 14, having a plurality of spaced support ribs 16 extending from a first side of ring member 12. One end of each spaced support rib 16 is attached to the side of ring member 12, while the outer ends thereof converge and intersect at a location 18 spaced from the first side of the ring member 12 to defining a volume 20 adjacent to the opening 14. An air filtering screen mesh 22, shaped to further define volume 20, is supported by the plurality of spaced support ribs 16. Accordingly, any air passing through opening 14 must eventually pass through filtering screen mesh 22. As shown, spaced support ribs 16 are straight and angled uniformly inwardly so that their outer ends intersect at point 18 which is on the axis line extending through opening 14, so that volume 20 is triangular in cross-section. While this configuration is perhaps the simplest to form, it should be apparent that it is not critical, as indeed other configurations would work as well, such as trapezoidal configurations or oval configurations, as long an the edge portions of the rib supports are insertable into an airway port of the apparatus, for reasons which should become apparent from the description below.

Each rib support 16 is provided with a first small flange 30 extending radially outward from the end thereof immediately adjacent to ring member 12, at least to the extent necessary to effect a primary interface rib surface 32 at the outer edge of each rib support 16 adjacent to an outer edge surface of the ring member 12. Ideally, the primary interface rib surfaces 32 are generally parallel to each other so that as spaced around the first side of ring member 12, the primary interface rib surfaces 32 will define a circle of predetermined diameter intended to match the circular diameter of a first airway port P' (see FIG. 3) into which insert filter 10 is to be insertable. Accordingly, primary interface rib surfaces 32 will be adapted to engage the inner edge surfaces of any larger, first airway port P' of such hardware apparatus into which the insert filter 10 is to be inserted. If the outer circumference of ring member 12 is larger than the diameter of first airway port P', it should be apparent that when insert filter 10 is press-fitted into airway port P', it will fit therein until ring member 12 is abutted against the outer surface of the hardware apparatus, with primary interface rib surfaces 32 tightly engaging the inner edge surfaces of first airway port P'.

Figure 4:
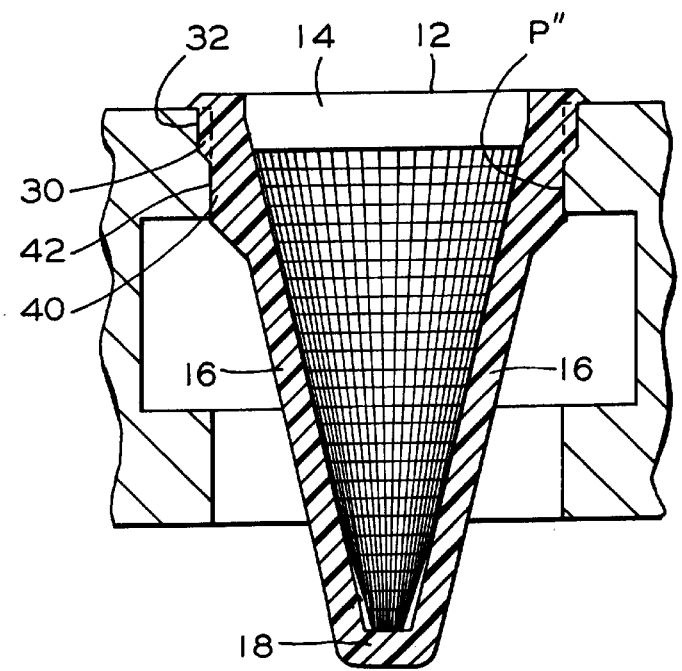
FIG. 4 is a cross-sectional view of the insert filter shown in FIGS. 1 and 2 as inserted into an airway port of an access plate.

In addition to the above described primary interface rib surfaces 32, each rib support 16 is provided with a second small flange 40 extending radially outward from the end thereof immediately adjacent to first small flange 30, at least to the extent necessary to effect a secondary interface rib surface 42 at the outer edge of each rib support 16 adjacent to the primary interface rib surface 32. Ideally, the secondary interface rib surfaces 42 are generally parallel to each other so that as spaced around the first side of ring member 12, below the primary interface rib surfaces 32, they will deifying a circle of predetermined diameter intended to match the circular diameter of a smaller, second airway port P'' (see FIG. 4) into which insert filter 10 is to also be insertable. Accordingly, secondary interface rib surfaces 42 will be adapted to engage the inner edge surfaces of any smaller, second airway port P'' of such hardware apparatus into which the insert filter 10 is to be inserted. Here, however, it is obvious that primary interface rib surfaces 32, which define a larger circle, will not fit into any such smaller, second airway port P''. Accordingly, the outer portion of airway port P'' will have to be counterbored to the extent necessary to receive flanges 30 and the primary interface rib surfaces 32, so that the filter insert 10 can be fully inserted with ring member 12 abutted against the outer surface of the hardware apparatus, with secondary interface rib surfaces 42 tightly engaging the inner edge surfaces of second airway port P''.

Figure 7:
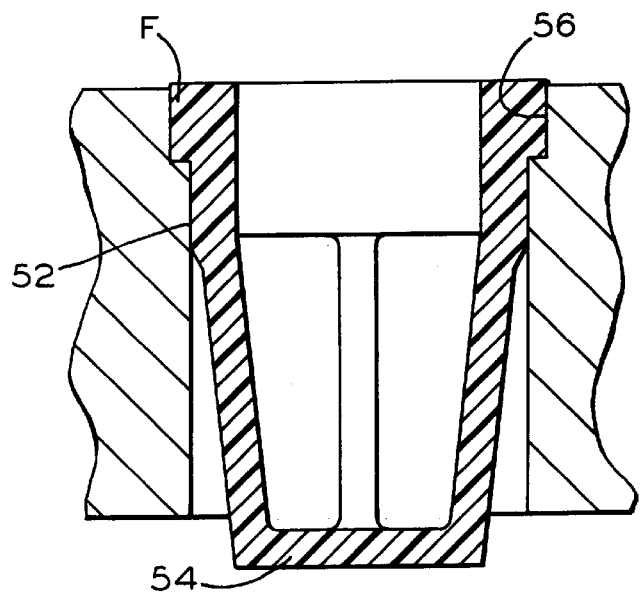
FIG. 7 is cross-sectional view of a prior art insert filter as inserted into an airway port of a pipe bracket.
Figure 3:
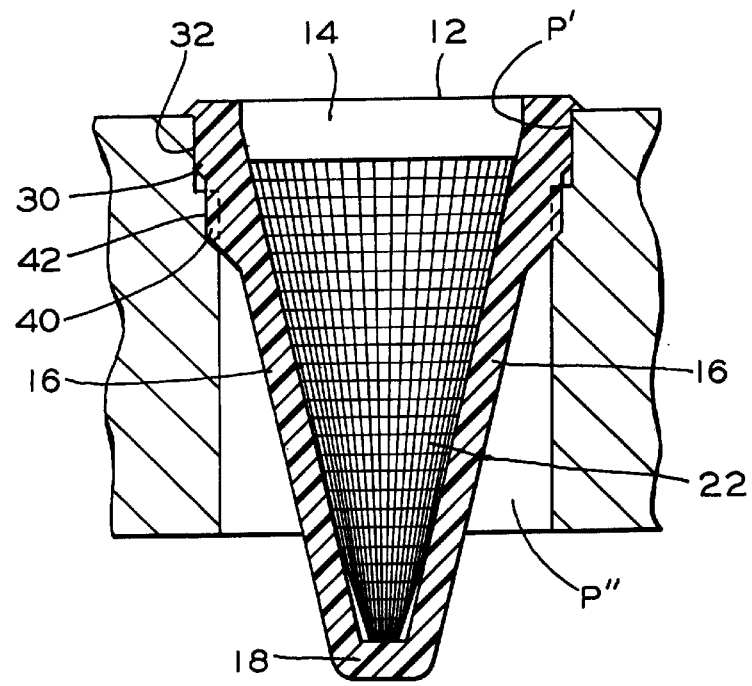
FIG. 3 is a cross-sectional view of the insert filter shown in FIGS. 1 and 2 as inserted into an airway port of a pipe bracket.

Depending on the prior art hardware apparatus and the form of the insert filter designed therefor, it may be necessary to modify the nature of any interface seal to accommodate the interchangability of the inventive insert filter. For example, as shown in FIG. 7 the prior art DPX Pipe Brackets are normally designed to receive a prior art insert filter having a relatively large counterbore at the outer edge designed to receive a prior art insert filter having a relatively thick flange F at the outer end such that the flange F will seat within the counterbore to form a seal between the edges of the flange F and counterbore, substantially as shown in FIG. 3. However, in order to accommodate the secondary interface rib surfaces 42, it is necessary to eliminate the sharp lower edge of the prior art relatively thick flange F, thereby eliminating the seal between the flange edge and the edge of the counterbore. To make-up for the loss of this seal, the inventive interchangeable insert filter 10, as intended for use with an SCTD Access Plate, and a DPX Pipe Bracket, it was necessary to provide a thin, sharp edged flange 50 at the extreme outer edge of ring member 12, such that the flange 50 will engage the flat outer surface of the hardware apparatus into which airway ports P' or P'' are provided. Accordingly, by using a compressible gasket (not shown) between the two abutting component parts of the apparatus (not shown in detail) a more than adequate seal is achieved between the insert filter and the hardware apparatus.

Having described in detail a presently preferred embodiment of this invention, it should be apparent that other embodiments could be utilized and modifications incorporated without departing from the spirit of the invention. As a first example, it has already been noted that the configuration of the filter screen mesh 22, can take any desired form other than triangular as shown. For example, it can be cylindrical, trapezoidal, arcuate or any other configuration provided, it is such that the filter screen mesh 22 is disposed across the pathway through the airway ports P' and P", and is such that rib supports 16 can maintain it in position and support its configuration. As an example, note the prior art configuration illustrated in FIG. 7 wherein the insert filter has a trapezoidal configuration.

In addition to these considerations, it is further noted that as shown in the drawings, insert filter 10 is shown to have but two diametrically opposed rib supports 16. Obviously, more that two can be provided, but ideally, two or three should be adequate which are preferably equally spaced around ring member 12. However, if airway ports P' or P" are not circular, then perhaps other arrangement will have to be utilized to assure that screen mesh 22 is properly supported on the rib supports 16, and to assure that the rib supports 16 will properly engage the sidewall surfaces of any such non-circular airway port.

In further addition to the above, it has also already been noted, the insert filter 10 could be further modified to make it insertable into three or more airway ports all of different diameters. To do so one must merely provide a third or more sets of interface rib surfaces in a descending order with those insertable into the largest diameter airway port at the top adjacent to the ring member, and progressing away therefrom with each succeeding smaller size. As also explained above, any hardware apparatus having any such smaller airway port will have to be counterbored to the extent necessary to receive any and all sets of interface rib surfaces, such as interface rib surfaces 32, 42 and any others which are intended for larger airway ports.

While the above disclosure has shown one technique to providing a seal between the filter insert 10 and the apparatus into which it is inserted, namely flange 50, other such sealing means could readily be provided without departing from the spirit of the invention depending upon the type of seal one must redesign for.

While the filter insert of this invention was primarily designed for use in hardware for railway air brake systems, the invention could readily be applied to other arts in which a plurality of filter sizes are utilized. Clearly, therefore, other modifications could be included and other embodiments designed by those persons who are skilled in any art as may be relevant without departing from either the spirit of the invention or the scope of the appended claims.

I claim:

1. An interchangeable insert filter for use within hardware apparatus of a railway air brake system on a railway car, and insertable within an airway port of such hardware apparatus through which air brake air must pass, said insert filter comprising;
    a) a ring member defining an opening;
    b) a plurality of spaced support ribs extending from a first side of said ring member and intersecting at a location spaced from said first side of said ring member to defining a volume adjacent to said opening;
    c) said support ribs in combination supporting an air filtering screen mesh adjacent to said opening, further defining said volume adjacent to said opening;
    d) each of said support ribs having a primary interface rib surface adjacent to an outer edge surface of said ring member to frictionally engage cylindrical inner surfaces of a first airway port of such hardware apparatus; and
    e) each of said support ribs also having a secondary interface rib surface adjacent to said primary interface rib surface to frictionally engage cylindrical inner surfaces of a second airway port of such hardware apparatus, whereby such second airway port is smaller than such first airway port.

2. An insert filter according to claim 1, further including a flange adjacent to a second side of said ring member adapted to seal against a flat surface of such hardware apparatus attachable transversely to such first and second airway ports.

3. An insert filter according to claim 1, in which said air filtering screen mesh is supported on inside surfaces of said plurality of spaced support ribs.

4. An insert filter according to claim 1, in which said volume and said air filtering screen mesh have a generally triangular cross-section.

5. An insert filter according to claim 1, in which said volume and said air filtering screen mesh have a generally trapezoidal cross-section.

6. An insert filter according to claim 1, in which said plurality of spaced support ribs are equally spaced.

7. An insert filter according to claim 6, in which said primary interface rib surfaces are equally spaced to frictionally engage inner cylindrical surfaces of a first generally circular airway port of such hardware apparatus.

8. An insert filter according to claim 6, in which said secondary interface rib surfaces are equally spaced to frictionally engage inner cylindrical surfaces of a second generally circular airway port of such hardware apparatus.

9. An insert filter according to claim 1, further having interface rib supports in addition to said primary and secondary interface rib supports to frictionally engage inner cylindrical surfaces of an airway port of such hardware apparatus smaller than such second airway port.

10. An interchangeable insert filter for use within hardware apparatus of a railway air brake system on a railway car, and insertable within an airway port of such hardware apparatus through which air brake air must pass, said insert filter comprising;
    a) a closed ring member defining a generally circular opening;
    b) a plurality of spaced support ribs extending from a first side of said ring member and intersecting at a location spaced from said first side of said ring member to defining a volume adjacent to said generally circular opening;
    c) said support ribs in combination supporting an air filtering screen mesh adjacent to said generally circular opening, further defining said volume adjacent to said circular opening;
    d) each of said support ribs having a primary interface rib surface adjacent to an outer generally circular edge surface of said ring member to frictionally engage inner cylindrical surfaces of a first generally circular airway port of such hardware apparatus; and
    e) each of said support ribs also having a secondary interface rib surface adjacent to said primary interface rib surface to frictionally engage cylindrical inner surfaces of a second generally circular airway port of such hardware apparatus, whereby such second generally circular airway port has a diameter smaller than the diameter of such first airway port.

11. An insert filter according to claim 10, further including a generally circular flange adjacent to a second side of said closed ring member to seal against a flat surface of such hardware apparatus transverse to such first and second generally circular airway ports.

12. An insert filter according to claim 10, in which said air filtering screen mesh is supported on inside surfaces of said plurality of spaced support ribs.

13. An insert filter according to claim 10, in which said volume and said air filtering screen mesh have a triangular cross-section.

14. An insert filter according to claim 10, in which said volume and said air filtering screen mesh have a trapezoidal cross-section.

15. An insert filter according to claim 10, further having interface rib supports in addition to said primary and secondary interface rib supports to frictionally engage cylindrical inner surfaces of an airway port of such hardware apparatus smaller than such second airway port.

16. An insert filter according to claim 10, in which said plurality of spaced support ribs are equally spaced.

17. An insert filter according to claim 16, in which said primary interface rib surfaces are equally spaced and frictionally engage cylindrical inner surfaces of a first generally circular airway port of such hardware apparatus.

18. An insert filter according to claim 16, in which said secondary interface rib surfaces are equally spaced and frictionally engage cylindrical inner surfaces of a second generally circular airway port of such hardware apparatus.

19. An insert filter according to claim 10, further having interface rib supports in addition to said primary and secondary interface rib supports to frictionally engage cylindrical inner surfaces of an airway port of such hardware apparatus smaller than such second airway port.

20. An interchangeable insert filter for use within hardware apparatus of a railway air brake system on a railway car, and insertable within an airway port of such hardware apparatus through which air brake air must pass, said insert filter comprising;

(a) a closed ring member defining a generally circular opening;

(b) a plurality of spaced support ribs extending from a first side of said ring member and intersecting at a location spaced from said first side of said ring member to defining a volume adjacent to said circular opening;

(c) an air filtering screen mesh supported by said plurality of spaced support ribs, said air filtering screen mesh further defining said volume adjacent to said circular opening;

(d) each of said support ribs having a first flange extending radially outward adjacent to an outer circular edge surface of said ring member, the outer surfaces of each said first flange defining a primary friction interface surface to frictionally engage inner cylindrical surfaces of an airway port of a first of such hardware apparatus; and (e) each of said support ribs also having a second flange extending radially outward adjacent to said first flange, the outer surfaces of each said second flange defining a secondary friction interface surface to frictionally engage inner cylindrical surfaces of a second airway port of a second such hardware apparatus.

\* \* \* \* \*